United States Patent
Qian

(10) Patent No.: US 11,042,528 B2
(45) Date of Patent: Jun. 22, 2021

(54) DATA UNIQUENESS CONTROL AND INFORMATION STORAGE

(71) Applicant: Advanced New Technologies Co., Ltd., Grand Cayman (KY)

(72) Inventor: Jianbo Qian, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 399 days.

(21) Appl. No.: 14/724,018

(22) Filed: May 28, 2015

(65) Prior Publication Data
US 2015/0347494 A1 Dec. 3, 2015

(30) Foreign Application Priority Data
May 30, 2014 (CN) .......................... 201410239045.4

(51) Int. Cl.
*G06F 16/23* (2019.01)
*H04L 29/06* (2006.01)
*G06F 16/2455* (2019.01)
*G06F 21/31* (2013.01)
*G06F 16/245* (2019.01)

(52) U.S. Cl.
CPC ........ *G06F 16/2365* (2019.01); *G06F 16/245* (2019.01); *G06F 16/24556* (2019.01); *G06F 16/24565* (2019.01); *G06F 21/31* (2013.01); *H04L 63/083* (2013.01)

(58) Field of Classification Search
None
See application file for complete search history.

(56) References Cited

U.S. PATENT DOCUMENTS 5,793,495 A 8/1998 Klotz, Jr.
5,835,912 A * 11/1998 Pet .................... G06F 17/289
5,918,225 A * 6/1999 White ............... G06F 17/30324
(Continued)

FOREIGN PATENT DOCUMENTS

CN 103594112 A 2/2014
JP 2007328418 A 12/2007

OTHER PUBLICATIONS

Dinei Florencio and Cormac Herley; A Large-Scale Study of Web Password Habits; 2007; World Wide Web; pp. 1-9 (Year: 2007).*
(Continued)

*Primary Examiner* — Mariela Reyes
*Assistant Examiner* — Jermaine A Mincey
(74) *Attorney, Agent, or Firm* — Lee & Hayes, P.C.

(57) ABSTRACT

Techniques for flexibly controlling data uniqueness which are applicable to different types of data that require different data uniqueness control. Control information mapped by a data storage space of a database is determined. The control information and data to be written into the data storage space is combined to obtain a combination result. The techniques of the present disclosure determine whether there is another combination result that is the same as the combination result. The techniques of the present disclosure, in response to determining that there is another combination result that is the same as the combination result, reject to write into the data storage space the data to be written into the data storage space of the database; or modify the another data in the database.

20 Claims, 7 Drawing Sheets

(56) References Cited

U.S. PATENT DOCUMENTS

| | | | | |
|---|---|---|---|---|
| 5,956,400 | A | * | 9/1999 | Chaum .................. H04L 29/06 380/28 |
| 6,466,942 | B1 | | 10/2002 | Tolkin |
| 6,684,215 | B1 | * | 1/2004 | Saracco ............ G06F 17/30371 707/702 |
| 7,752,181 | B2 | | 7/2010 | Klein et al. |
| 8,543,555 | B2 | | 9/2013 | Jayaraman |
| 2006/0122963 | A1 | * | 6/2006 | Klein ................ G06F 17/30312 |
| 2006/0288045 | A1 | * | 12/2006 | Raz ........................ G06F 16/284 |
| 2007/0043783 | A1 | | 2/2007 | Idicula et al. |
| 2007/0179885 | A1 | * | 8/2007 | Bird ........................ G06Q 20/10 705/39 |
| 2008/0010497 | A1 | * | 1/2008 | Kronlund ............ G06F 11/0769 714/6.11 |
| 2009/0006487 | A1 | | 1/2009 | Gavrilov et al. |
| 2009/0210938 | A1 | * | 8/2009 | Childress ................ G06F 21/31 726/18 |
| 2009/0279682 | A1 | | 11/2009 | Strandell et al. |
| 2012/0060213 | A1 | * | 3/2012 | Childress ................ G06F 21/31 726/18 |
| 2012/0066465 | A1 | | 3/2012 | Rabeler et al. |
| 2012/0173558 | A1 | | 7/2012 | Sorenson, III |
| 2013/0014236 | A1 | * | 1/2013 | Bingell ............... H04L 63/0846 726/6 |

OTHER PUBLICATIONS

PCT Search Report and Written Opinion dated Sep. 3, 2015 for PCT Application No. PCT/US15/32886, 10 pages.

The Extended European Search Report dated Oct. 6, 2017 for European Patent Application No. 15798741.3, 10 pages.

"WhatsApp FAQ—Seeing your phone number already in WhatsApp," retrieved on Sep. 27, 2017 at <<https://faq.whatsapp.com/en/android/24068052/?category=5245246>>, 3 pages.

Chinese Office Action dated Feb. 5, 2018 for Chinese application 2014102390453.4, a counter part of foreign application of U.S. Appl. No. 14/724,018, 8 pages.

The European Office Action dated Oct. 19, 2018, for European Application No. 15798741.3, a counterpart foreign application of the U.S. Appl. No. 14/724,018, 8 pages.

Chinese Office Action dated Aug. 17, 2018 for Chinese application 2014102390453.4, a counterpart of foreign application of U.S. Appl. No. 14/724,018, 13 pages.

Chinese Search Report dated Aug. 1, 2018 for Chinese patent application No. 201410239045.4, 2 pages.

The European Office Action dated Jul. 10, 2019 for European Patent Application No. 15798741.3, a counterpart of U.S. Appl. No. 14/724,018, 9 pages.

"SQL UNIQUE Constraint", retrieved on Jul. 3, 2019 at <<https://web.archive.org/web/20140529234153/https://www.w3schools.com/sql/sql_unique.asp>>, May 29, 2014, 2 pages.

Chinese Search Report dated Jan. 17, 2018 for CN patent application No. 201410239045.4, 2 pages.

Joe Celko, "SQL for Programmers," 4th Ed, 1st ed, Shoeisha Co, Ltd., Japan, May 23, 2013, pp. 71-73.

The Japanese Office Action dated Apr. 2, 2019 for Japanese Patent Application No. 2016-564996, a counterpart of U.S. Appl. No. 14/724,018, 7 pages.

System Technology Eye, Co. Ltd, "Oracle Master Textbook, Bronze Oracle Database 11g SQL Basic I," 1st Ed., Shoeisha Co., Ltd., Japan, Dec. 2, 2008, pp. 288-291.

The European Office Action dated Apr. 20, 2020 for European Patent Application No. 15798741.3, a counterpart of U.S. Appl. No. 14/724,018, 11 pages.

The European Office Action dated Oct. 20, 2020 for European Patent Application No. 15798741.3, a counterpart of U.S. Appl. No. 14/724,018, 7 pages.

* cited by examiner

DATA UNIQUENESS CONTROL AND INFORMATION STORAGE

CROSS REFERENCE TO RELATED PATENT APPLICATION

This application claims foreign priority to Chinese Patent Application No. 201410239045.4 filed on 30 May 2014, entitled "Method and Apparatus for Controlling Data Uniqueness and Information Storage," which is hereby incorporate by reference in its entirety.

TECHNICAL FIELD

The present disclosure relates to the field of computer technology, and, more particularly, to a method and an apparatus for controlling data uniqueness and information storage.

BACKGROUND

Currently, some service systems have control requirements of data uniqueness. The data uniqueness indicates whether the data is unique or not in a data set where the data is located, that is, whether the data is the same as other data in the data set.

By using different types of passwords (for example, a login password and a payment password) corresponding to a user account as an example, some service systems allow that a login password and a payment password corresponding to a single user account may be the same, and some service systems forcibly require that a login password and a payment password of a single user account cannot be the same.

The data uniqueness control method adopted in the prior art has at least the following defects: with respect to different data, the same determination program is used to implement the same uniqueness determination mechanism, and therefore, the conventional methods cannot be applicable to a service system that requires different uniqueness control requirements of different types of data, thereby having poor flexibility.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to apparatus(s), system(s), method(s) and/or computer-readable instructions as permitted by the context above and throughout the present disclosure.

An example embodiment of the present disclosure provides a data uniqueness control method, which is used for flexibly controlling data uniqueness, and is applicable to a scenario that has different uniqueness control requirements of different types of data.

An example embodiment of the present disclosure further provides a data uniqueness control apparatus, which is used for flexibly controlling data uniqueness, and is applicable to a scenario that has different uniqueness control requirements of different types of data.

An example embodiment of the present disclosure further provides an information storage method and an information storage apparatus.

The example embodiments of the present disclosure provide the following technical solutions:

An example data uniqueness control method may include the following operations. Data to be written into a data storage space of a database is determined. Control information mapped by the data storage space of the database is determined. Data storage spaces of the database corresponding to data with different to-be-written contents may be mapped to same control information, and the control information is determined according to specific data mapped by each data storage space. The control information and the data to be written into the data storage space are combined to obtain a combination result. Whether there is another combination result that is the same as the combination result is determined. The another combination result is a combination result obtained by combining data stored in another data storage space of the database and control information mapped by the another data storage space. When a determination result is yes, the following operations are performed. The data to be written into the data storage space of the database is rejected to be written into the data storage space. Alternatively, the data in the database is modified so that the database does not have another combination result that is the same as the combination result and the data to be written into the data storage space of the database is written into the data storage space.

An example information storage method may include the following operations. First control information storage spaces mapped by different data storage spaces corresponding to data with different to-be-written contents are determined. Same control information is stored in the determined first control information storage spaces.

Another example information storage method may include the following operations. Control information storage spaces mapped by different data storage spaces corresponding to data with same to-be-written contents are determined. Different control information is stored in the determined control information storage spaces.

An example data uniqueness control apparatus may include the following units. An information determining unit determines control information mapped by a data storage space of a database. Data storage spaces of the database corresponding to data with different to-be-written contents are mapped to the same control information, and the control information is determined according to specific data mapped by each data storage space. A combining unit combines data to be written into the data storage space and the control information determined by the information determining unit to obtain a combination result. A first determining unit determines whether there is another combination result that is the same as the combination result obtained by the combining unit. The another combination result is a combination result obtained by combining data stored in another data storage space of the database and control information mapped by the another data storage space. An operation executing unit, when a determination result obtained by the first determining unit is yes, executes the following operations: rejecting to write into the data storage space the data to be written into the data storage space of the database; or modifying data in the database such that the database does not have another combination result that is the same as the combination result, and writing into the data storage space the data to be written into the data storage space of the database.

An example information storage apparatus may include the following units. A space determining unit determines, from a database, first control information storage spaces mapped by different data storage spaces corresponding to data with different to-be-written contents. A storage executing unit stores the same control information in the first control information storage spaces determined by the space determining unit.

Another example information storage apparatus may include the following units. A space determining unit determines, from a database, control information storage spaces mapped by different data storage spaces corresponding to data with same to-be-written contents. A storage executing unit stores different control information in the determined control information storage spaces.

At least one of the above technical solutions adopted in the example embodiments of the present disclosure may achieve the following beneficial technical effects.

The techniques of the present disclosure support that the same control information may be stored in control information storage spaces mapped by data storage spaces of a database having data with different to-be-written contents, and uniqueness control of data is implemented based on the control information. Therefore, flexible control on the data uniqueness may be implemented, which may be applicable to a scenario that has different uniqueness control requirements of different types of data.

BRIEF DESCRIPTION OF THE DRAWINGS

The accompanying drawings described herein are used to provide further understanding of the present disclosure, and constitute a part of the present disclosure. The example embodiments of the present disclosure and descriptions thereof are used to illustrate the present disclosure, and are not intended to limit the present disclosure improperly.

DETAILED DESCRIPTION

To make the objectives, technical solutions and advantages of the present disclosure clear, the technical solutions of the present disclosure are described by reference to example embodiments and corresponding accompanying FIGs. of the present disclosure. Apparently, the example embodiments in the following description merely represent a part of embodiments of the present invention, instead of all embodiments. On the basis of the example embodiments in the present disclosure, all other embodiments derived by a person of ordinary skill in the art without creative efforts shall fall within the protection scope of the present disclosure.

Technical solutions provided by the example embodiments of the present disclosure are described in detail as follows through the accompanying FIGS.

Figure 1:
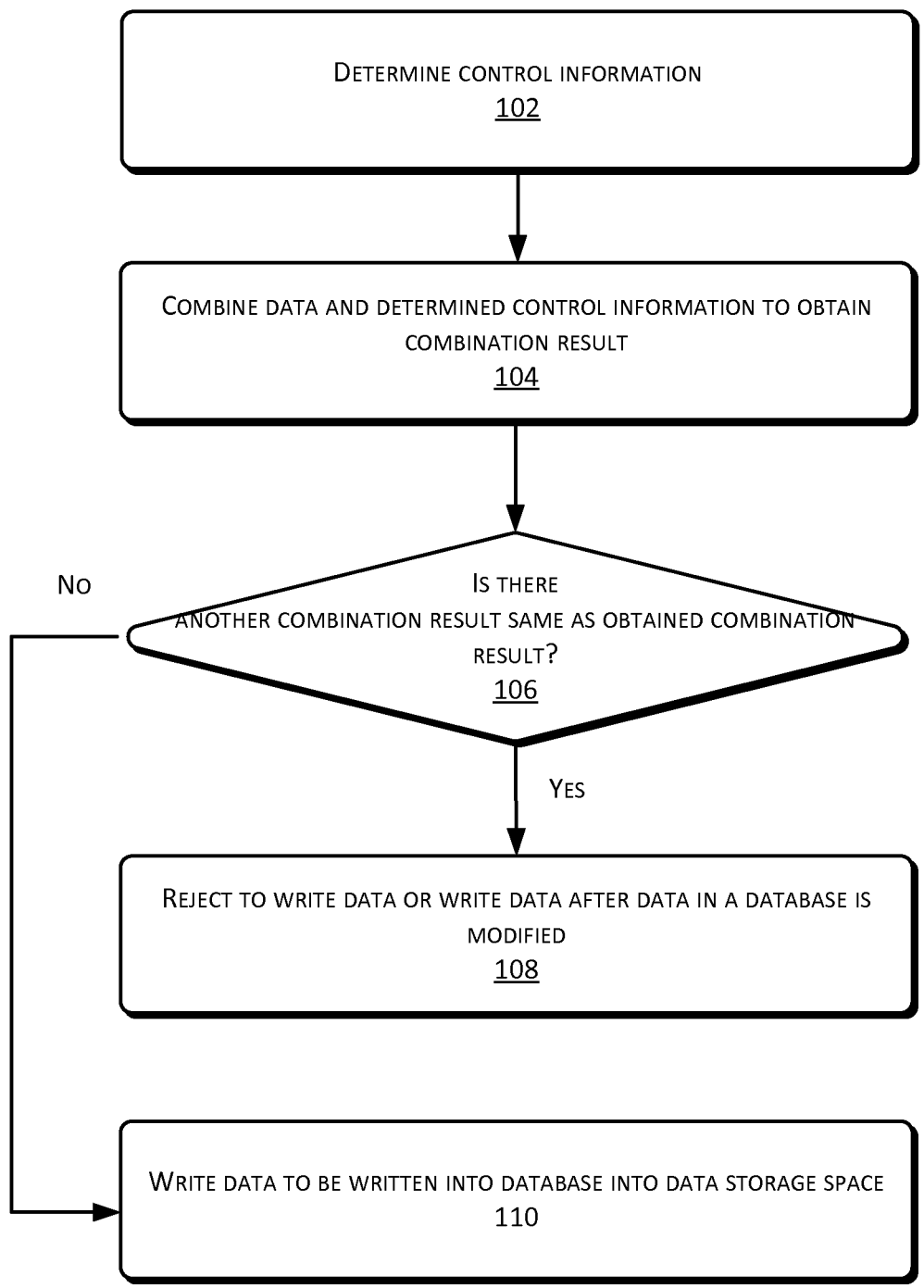
FIG. 1 is a flow chart of an example data uniqueness control method according to a first example embodiment of the present disclosure.

A first example embodiment of the present disclosure provides an example data uniqueness control method, which includes the following operations as shown in FIG. 1:

At 102, control information mapped by a data storage space of a database is determined.

For example, the control information is a character string. After the control information is combined with data in the data storage space mapped by the control information, a combination result is different from another combination result determined for the database. The another combination result refers to a combination result of combining another control information in the database with data in a data storage space mapped by the another control information.

In the first example embodiment, a mapping relationship between the data storage space and the control information may be as shown in Table 1 below. In Table 1, data stored in a first data storage space is an account identification (ID), data stored in a second data storage space is a password, data stored in a third data storage space is data for indicating a password type, and a control information storage space is used to store the control information.

Each type of data has a mapping relationship with storage spaces in which other types of data in the same line are located; and a storage space in which each type of data in one line is located has a mapping relationship with storage spaces in which other types of data in the same line are located.

TABLE 1

| Serial Number | First Data Storage Space (for storing an account ID) | Second Data Storage Space (for storing a password) | Third Data Storage Space (for storing data indicating a password type, where a indicates a payment password, and b indicates a login password) | Control Information Storage Space (for storing control information) |
| --- | --- | --- | --- | --- |
| 1 | 2088000001 | aaaaaa | a | 2088000001 |
| 2 | 2088000001 | uujduss | b | 2088000001 |
| 3 | 2088000002 | aaaaac | a | 2088000002 |
| 4 | 2088000002 | aaaadd | b | 2088000002 |
| 5 | 2088000003 |  |  | 2088000003 |
| 6 | 2088000003 | bbbxxxx | b | 2088000003 |

In the example embodiment of the present disclosure, when different types of data have the same uniqueness control requirement, an account ID may be directly used as control information, and therefore, the "first data storage space" is equivalent to the "control information storage space."

However, to meet the requirement of flexible control of uniqueness of different types of data, generally an independent control information storage space is set to store control information dedicatedly. The control information in the independent control information storage space is generally determined according to specific data "account ID" stored in the first data storage space. By using Table 1 as an example, assuming that passwords in the $6^{th}$ line and $7^{th}$ line cannot have the same content, according to the specific data "2088000003" in the two lines, the control information stored in the control information storage space mapped by the second data storage space, in which the password is to be written, is "2088000003."

At 104, the data to be written into the data storage space as described in 102 and the control information determined by executing operations at 102 are combined to obtain a combination result.

In the first example embodiment, a method of combining the data to be written into the database and the determined control information may be as follows:

The data to be written into the database and the determined control information is combined in a manner that the data to be written into the database is ahead of the control information to construct a character string.

Alternatively, the data to be written into the database and the determined control information is combined in a manner that the data to be written into the database is behind of the control information to construct a character string.

Alternatively, the data to be written into the database and the determined control information may be combined in other manners. The present disclosure does not restrict any specific combination manner.

By taking the data to be written into the database is the password "bbbbbb" in the $6^{th}$ line of Table 1 as an example, the password may be combined with the control information "2088000003" in the $6^{th}$ line to obtain a character string "bbbbbb2088000003."

At 106, whether there is another combination result that is the same as the combination result obtained at 104 is determined. When a determination result is yes, operations at 108 are performed; otherwise, operations at 110 are performed.

The another combination result is a combination result obtained by combining data stored in another data storage space of the database and control information mapped by the another data storage space.

For example, by using the character string "bbbbbb2088000003" obtained by combining the password "bbbbbb" and the control information "2088000003" as an example, assuming that the data stored in the database is as shown in Table 1, by executing operations at 106, the techniques of the present disclosure determine whether each combination result obtained by combining passwords in the $1^{st}$ to $4^{th}$ line and the $6^{th}$ line and their corresponding control information respectively is the same as the character string "bbbbbb2088000003."

As known from Table 1, the combination results obtained by combining the passwords in the $1^{st}$ to $4^{th}$ line and the $6^{th}$ line and their corresponding control information respectively are all different from "bbbbbb2088000003: Thus, operations at 110 are executed subsequently; otherwise, operations at 108 are executed.

At 108, the data to be written into the database is rejected to be written into the data storage space, and the process ends. Alternatively, the data in the database is modified so that the database does not have another combination result that is the same as the combination result obtained at 104, and the data to be written into the database is written into the data storage space, and the process ends.

Optionally, after the data in the database is modified, a mapping relationship between the data to be written into the data storage space of the database and a conflict identifier may be established, and a mapping relationship between the modified data in the database and the conflict identifier may also be established. The conflict identifier is used to indicate that data having a mapping relationship with the conflict identifier is the same as content of other data stored in the database.

At 110, the data to be written into the database is written into the data storage space, and the process ends.

By using the above method of the first example embodiment, data storage spaces having data with different to-be-written contents may be mapped to the same control information, data storage spaces having data with the same to-be-written content may be mapped to different control information, and uniqueness control of data may be implemented based on the control information. Thus, different uniqueness control on different data of the same service system may be supported, thereby implementing the flexible control of the data uniqueness. The techniques of the present disclosure are applicable to a scenario having different uniqueness control requirements of different types of data.

In the first example embodiment, to implement storage of the control information, the above method may further include the following operations: determining, from the database, control information storage spaces mapped by data storage spaces having data with different to-be-written contents; and storing the same control information in the determined control information storage spaces. The time to execute such operations may, include but is not limited to, before determining the control information stored in the control information storage space mapped by the data storage space.

Optionally, the method provided in the first example embodiment may further support access to data. For example, a data access request sent by a terminal may be received, and data in the database may be queried according to the data access request.

After the data is found through querying, if it is determined that there is a conflict identifier having a mapping relationship with the queried data, the terminal may be instructed to prompt a user to input an instruction for indicating whether to modify the queried data.

Subsequently, if an instruction sent by the terminal for indicating modification of the queried data is received, the queried data may be updated by using data included in the instruction. Once the queried data is updated, the mapping relationship between the queried data and the conflict identifier may be terminated.

If an instruction sent by the terminal for indicating not to modify the queried data is received, it may be determined whether the queried data is data undergone a reversible modification; when a determination result is yes, a reverse operation of the reversible modification is executed on the queried data so as to obtain the modified data; and the reversible modification is executed on data in the database that is the same as the modified data.

Optionally, the method provided in the first example embodiment may include the following operations: determining, from the database, control information storage spaces mapped by data storage spaces having data with same to-be-written contents; and storing different control information in the determined control information storage spaces. The time to execute this operation may include, but is not limited to, before determining the control information mapped by the data storage space.

As the data storage spaces having data with same to-be-written contents are mapped to different control information, with respect to combination results directed to data and control information, if the control information is different, different combination results may be obtained even though the data is the same, thereby ensuring overall uniqueness of the combination results. In other words, when different control information storage spaces store the same control information, data stored in data storage spaces respectively mapped to the different control information storage spaces may have the same content.

It should be noted that the operations may be executed by a same device, or the method may also be executed by different devices. For example, operations from 102 to 106 may be executed by a device 1, operations of 108 and 110 may be executed by a device 2. For another example, operations at 102 may be executed by device 1, and operations from 104 to 110 may be executed by device 2, etc.

Figure 2:
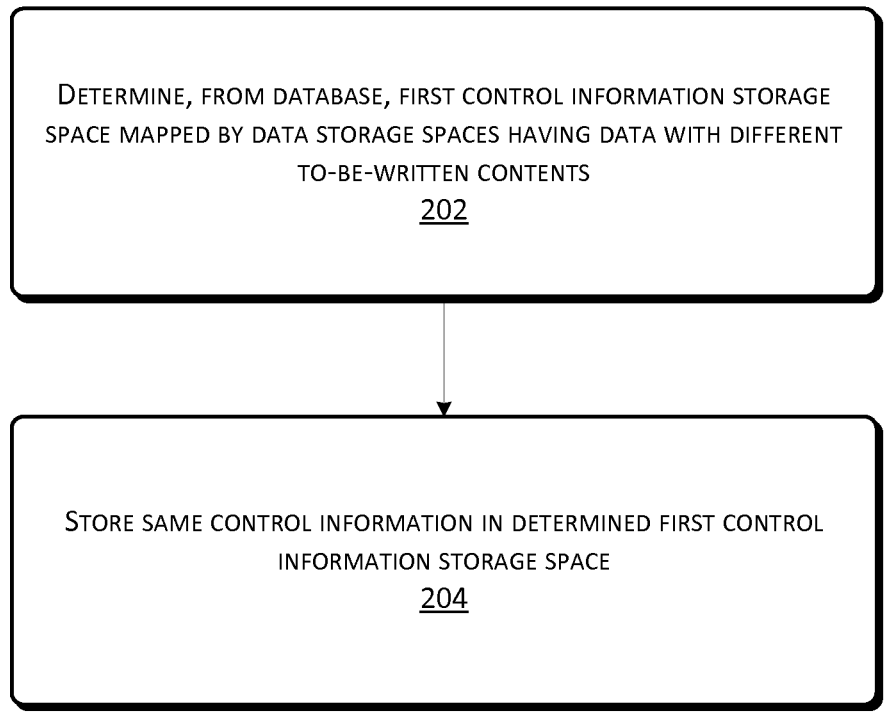
FIG. 2 is a flow chart of a first example information storage method according to a second example embodiment of the present disclosure.

A second example embodiment provides two kinds of information storage methods. A flow chart of a specific implementation of a first example information storage method is shown in FIG. 2, which may mainly include the following operations:

At 202, control information storage spaces mapped by data storage spaces having data with different to-be-written contents are determined from a database. For the purpose of description, the determined control information storage spaces are referred to as first control information storage spaces in the second example embodiment.

At 204, the same control information is stored in the determined first control information storage spaces.

Optionally, the information storage method provided in the second example embodiment may further include the following operation I and operation II.

At operation I: control information storage spaces mapped by data storage spaces having data with same to-be-written contents are determined from a database. For the purpose of description, the control information storage spaces determined by executing operation I are referred to as second control information storage spaces in the second example embodiment.

At operation II: different control information is stored in the second control information storage spaces determined by executing operation I.

Figure 3:
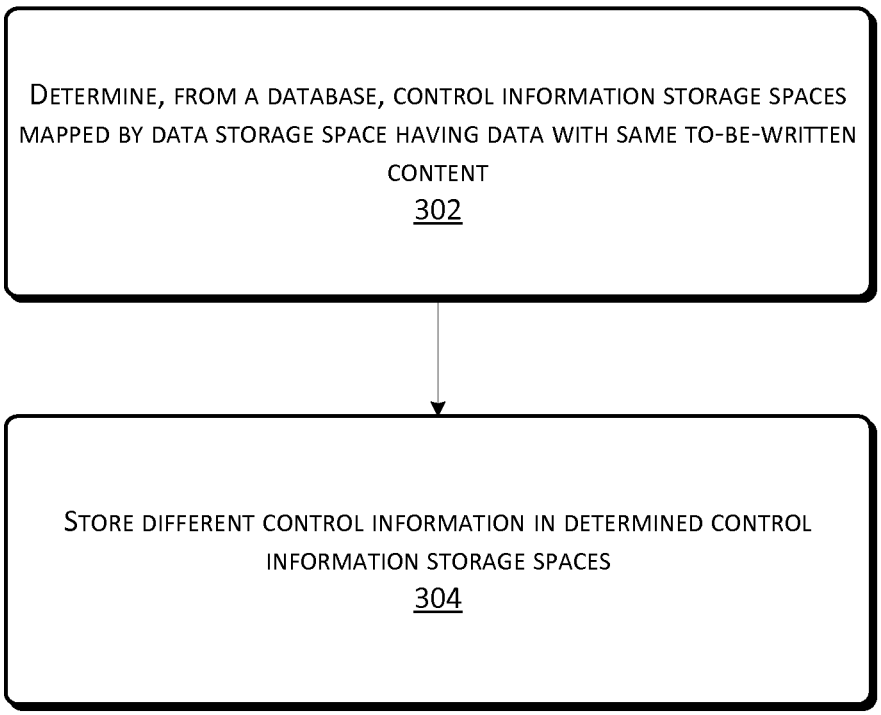
FIG. 3 is a flow chart of a specific implementation of a second information storage method according to the second example embodiment of the present disclosure.

A flow chart of a specific implementation of a second example information storage method provided in the second example embodiment is shown in FIG. 3, which may mainly include the following operations:

At 302, control information storage spaces mapped by data storage space having data with same to-be-written content are determined from a database.

At 304, different control information is stored in the determined control information storage spaces.

It should be noted that the operations of the first example method provided by the second example embodiment may be executed by a same device, or the method may be executed by different devices. For example, operations 202 may be executed by a device 1, and operations 204 may be executed by a device 2; for another example, operations 202 and 204 may both be executed by device 1. Similarly, the operations of the second example method provided by the second example embodiment may be executed by the same device or different devices.

A third example embodiment of the present disclosure provides an example method for controlling uniqueness of a password so as to solve a problem of registration failure of a new user that may occur when using a mobile phone number as a login name and a same mobile phone is allocated for a second time. The so-called "number allocation" refers that a mobile communications network operator allocates, to a user, a communication number determined as an idle number.

A background of the method provided in the third example embodiment is introduced first.

Currently, many Internet-based and wireless service systems allow that a login name used by a user is generally a string of numerals (for example, a QQ™ number or a mobile phone number) or an e-mail. Generally, when the user registers the used login name, the service system performs uniqueness control on the login name so that the user is forced not to use a login name that is the same as a used login name. This uniqueness control manner may effectively prevent different users from using the same login name; however, when the same mobile phone number is allocated for the second time, if a user using the mobile phone number allocated for the first time (the user is referred to as a former user later for the purpose of description) has used the mobile phone number as a login number, another user using the mobile phone number allocated for the second time (the user is referred to as a latter user later for the purpose of description) may not use the mobile phone number as a login name again.

Under the conventional techniques, when the latter user may not use the mobile phone number allocated for the second time as a login name, a general solution is that the latter user calls a human customer service, and provides, to the human customer service, evidences for proving legitimacy of the latter user using the mobile phone number. After confirming that the latter user has the right of using the mobile phone number, the human customer service forcibly modifies the mobile phone number used by the former user as a login name so that the latter user may use the mobile phone number as the login name.

The above solution has the following defects:

1. The solution has poor timeliness and convenience when the latter user uses the mobile phone number allocated for the second time as a login name, which severely affects the experience of the latter user.

2. The solution has a high labor cost. Along with the expansion of the number of mobile phone users, hundreds of millions of users may generate a very huge demand on human customer services.

3. The latter user may not use the mobile phone number allocated for the second time as a login name as long as the human customer service does not modify the login name used by the former user.

4. After the latter user registers successfully by using the mobile phone number allocated for the second time as a login name, the former user using the mobile phone number allocated for the first time as a login name will lose a login portal, so that the former user may not log in by using the mobile phone number.

Under the above background, the third example embodiment of the present disclosure provides an example method for controlling uniqueness of a password. The method is applicable to a system allowing using a mobile phone number as a login name, which may support the latter user to smoothly complete registration by using the mobile phone number allocated for the second time as a login name. At the same time, the former user may still use the mobile phone number as a login name, and the former user is guided to update the mobile phone number.

Implementation principles of the method provided in the third example embodiment are further described as follows:

First, an example data table structure used in the method provided in the third example embodiment is described as follows. The data table structure in the third example embodiment is shown in Table 2.

TABLE 2

| Serial Number | Content of Field 1 Login name body + separator + recognition factor | Content of Field 2 Login password | Content of Field 3 Password control |
|---|---|---|---|
| 1 | 13900100110\|A987688ab | aaaaaa | 13900100110 |
| 2 | 13556781109\|s | aaaaaa | 13556781109 |
| 3 | 13556781109\|Aktsd098 | Aaaakk | 13556781109 |
| 4 | 13988888888\|A88dsllld | bbbbbb | 13988888888 |
| 5 | 13988888888\|T0208 | bbbbbb | 13988888888\|T0208 |

The content of field 1 in Table 2 is a login name. The login name may be divided into three parts, namely, a "login name body," a "separator." and a "recognition factor," that is, the login name=the login name body+the separator+the recognition factor.

In the third example embodiment, the login name body and the recognition factor may both be character strings. Each recognition factor may be a character string uniquely existing in the data table, which is not public and is a code for private use in the database and may be expanded randomly. Generally, the recognition factor may be formed by a specific code and/or a random number.

By using Table 2 as an example, recognition factors in the $3^{rd}$, $5^{th}$ and $6^{th}$ lines in Table 2 are each formed by a certain service code started with "A" and a 1-digit random number. A recognition factor in the $4^{th}$ line is a specific code "s" and a recognition factor in the $7^{th}$ line is formed by a specific code started with "T" and a 1-digit random numeral.

It may be stipulated in the third example embodiment that: when the recognition factor is a specific code "s," it indicates that a login name body before the specific code is a mobile phone number used by the former user; and when the recognition factor is started with "T," it indicates that the login name body is a "private login name body" set by the user.

In the third example embodiment, a manner for processing the private login name body may be obtained with reference to specific description of operations at 506 as follows, which is not repeated herein.

The content of the field 2 is the login password. In the whole data table, whether content of a login password is allowed to be the same as another login password is controlled by the content of the field 3.

The content of the field 3 is "password control," that is, the "control information" as described in the first example embodiment and the second example embodiment. In contrast to the structure of the data table commonly used in the existing techniques as shown in Table 3, the field of the password control is a newly added field in the third example embodiment. Specifically, with respect to the structure of the data table used in the existing techniques, please refer to the following Table 3.

TABLE 3

| Serial Number | Content of Field 1 Login name | Content of Field 2 Login password |
|---|---|---|
| 1 | 13900100110 | aaaaaa |
| 2 | 13556781109 | aaaaaa |
| 3 | 13988888888 | bbbbbb |

Based on the data table shown in Table 2 used in the third example embodiment, the following description illustrates how to implement the method for controlling uniqueness of a password provided in the third example embodiment during the registration of the latter user by using the mobile phone number allocated for the second time.

Figure 4:
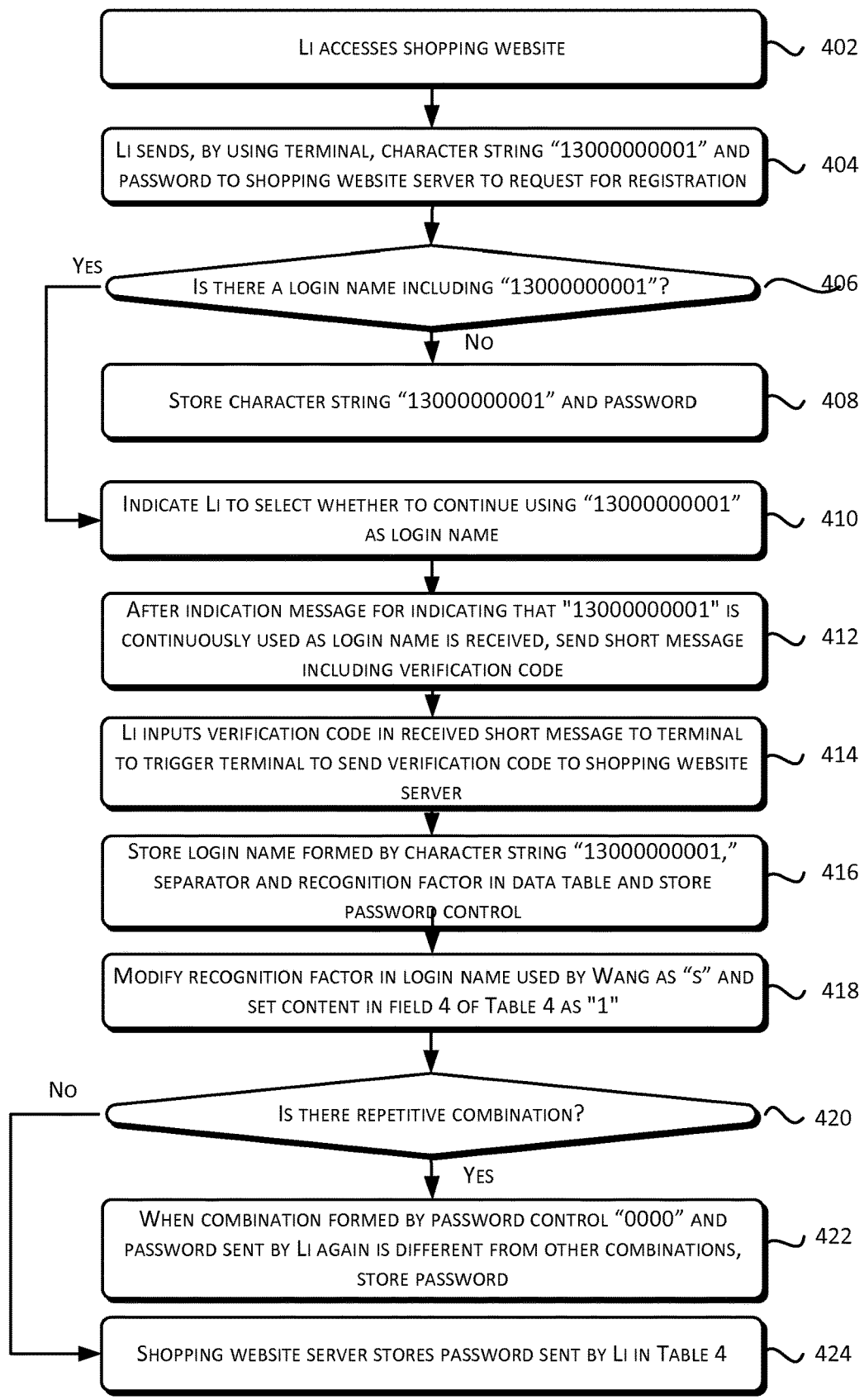
FIG. 4 is a flow chart of an example user registration by a user using a mobile phone number according to a third example embodiment of the present disclosure.

FIG. 4 is a flow chart illustrating an example method for a user registration by using a mobile phone number allocated for the second time in the third example embodiment, which may mainly includes the following operations.

At 402, after a mobile communications network operator allocates a mobile phone number such as "13000000001" for a second time and a user such as Li obtains the right of using the mobile phone number, Li accesses to a certain shopping website.

At 404, Li sends, by using a terminal, a character string "13000000001" and a password to a shopping website server to request for registration.

At 406, the shopping website server queries a database for storing registered login names, and executes operations at 408 when it is found through querying that the database does not have a login name including the character string "13000000001," or executes operations at 410 when it is found through querying that the database has a login name including the character string "13000000001."

At 408, the shopping website server stores the character string and the password corresponding to the character string "13000000001" sent by Li using the terminal in the data table as shown in Table 2, and allocates a user obtaining right allowing successful registration to Li. The process ends. When the character string is stored, the character string may be added with a separator and a recognition factor thereafter.

At 410, the shopping website server sends a prompt message to the terminal used by Li to instruct Li to select whether to continue to use "13000000001" as a login name or not.

At 412, after receiving an indication message sent by Li through the terminal that indicates that "13000000001" is continuously used as the login name, the shopping website server sends a short message including a verification code to the mobile phone number "13000000001."

At 414, Li inputs the verification code in the received short message to the terminal to trigger the terminal to send the verification code to the shopping website server.

At 416, when receiving the verification code sent by Li by using the terminal, the shopping website server determines that Li has the right of using the mobile phone, as shown in Table 4. Moreover, the shopping website server further stores a password control corresponding to the character string in Table 4. For example, the password control may be "0000" as shown in Table 4.

In addition to storing the password control in a line in which the login name of Li is stored, the shopping website server further stores the password control in a line in which a queried login name including "13000000001" is stored.

In the third example embodiment, assuming that the queried login name including "13000000001" is a login name used by another user such as Wang.

TABLE 4

| Serial Number | Content of Field 1 Login name body + separator + recognition factor | Content of Field 2 Login password | Content of Field 3 Password cantrol | Content of Field 4 Seizing identifier |
|---|---|---|---|---|
| 1 | 13000000001\|A987688ab (a login name of Li) | aaaaaa | 0000 | 1 |
| 2 | 13000000001\|s (a login name of Wang) | bbbbbb | 0000 | 1 |

TABLE 4-continued

| Serial Number | Content of Field 1 Login name body + separator + recognition factor | Content of Field 2 Login password | Content of Field 3 Password cantrol | Content of Field 4 Seizing identifier |
|---|---|---|---|---|
| 3 | 13556781109\|Rkttdihss | aaaaaa | 13556781109 | 1 |
| 4 | 13556781109\|Aktsd098 | Aaaakk | 13556781109 | 1 |
| 5 | 13988888888\|A88dsIlld | bbbbbb | 13988888888 | 1 |
| 6 | 13988888888\|T0208 | bbbbbb | 13988888888\|T0208 | 1 |

At 418, the shopping website server modifies a recognition factor in the login name used by Wang to "s," and sets the content in the field 4 of Table 4 as "1."

The recognition factor "s" is used to indicate that the login name including the "s" is a login name used by a former user.

When the content of the field 4 is set as "1," it indicates that the "seizing identifier" is 1, that is, Table 4 has at least two login names including the login name body; when the content of the field 4 is set as "0," it indicates that a corresponding login name body is not seized by different users, that is, Table 4 merely has one login name including the login name body.

At 420, the shopping website server determines whether a combination formed by the password control "0000" and the password sent by Li at 402 is the same as another combinations formed by another password control in Table 4 and a corresponding password. When a determination result is yes, operations at 422 are executed; or when the determination result is no, operations at 424 are executed.

At 422, the shopping website server prompts Li to use another password. When it is determined that a combination formed by the password control "0000" and another password sent by Li according to the prompt is different from the combinations formed by other passwords in Table 4 and corresponding password controls, the shopping website server stores the another password sent for the second time in Table 4. The process ends.

At 424, the shopping website server stores the password sent by Li in Table 4. The process ends.

In the third example embodiment, after the shopping website server successfully stores the login name and password of Li, a timer may be started for timing, and when it is determined that Wang does not log in the shopping website server by using the original login name body "13000000001" within a preset timing period (for example, one year), the login name of Wang is deregistered.

As shown from the above operations, as "a combination of a password control and a password is overall unique" is used as a condition of allowing a password to be written into a data table (database), the techniques of the present disclosure effectively ensure that storage spaces, to which passwords with different to-be-written contents are written, finally store passwords different from one another, thereby avoiding the problem of repetitive passwords.

Likewise, according to an implementation principle similar to the process as shown in FIG. 4, when "a combination of a password control and a login name is overall unique" is used as a condition allowing a login name body to be written into a data table (database), the techniques of the present disclosure effectively ensure that storage spaces, to which login name bodies with different to-be-written contents are written, finally store login name bodies different from one another, thereby avoiding the problem of repetitive login name bodies.

Figure 5:
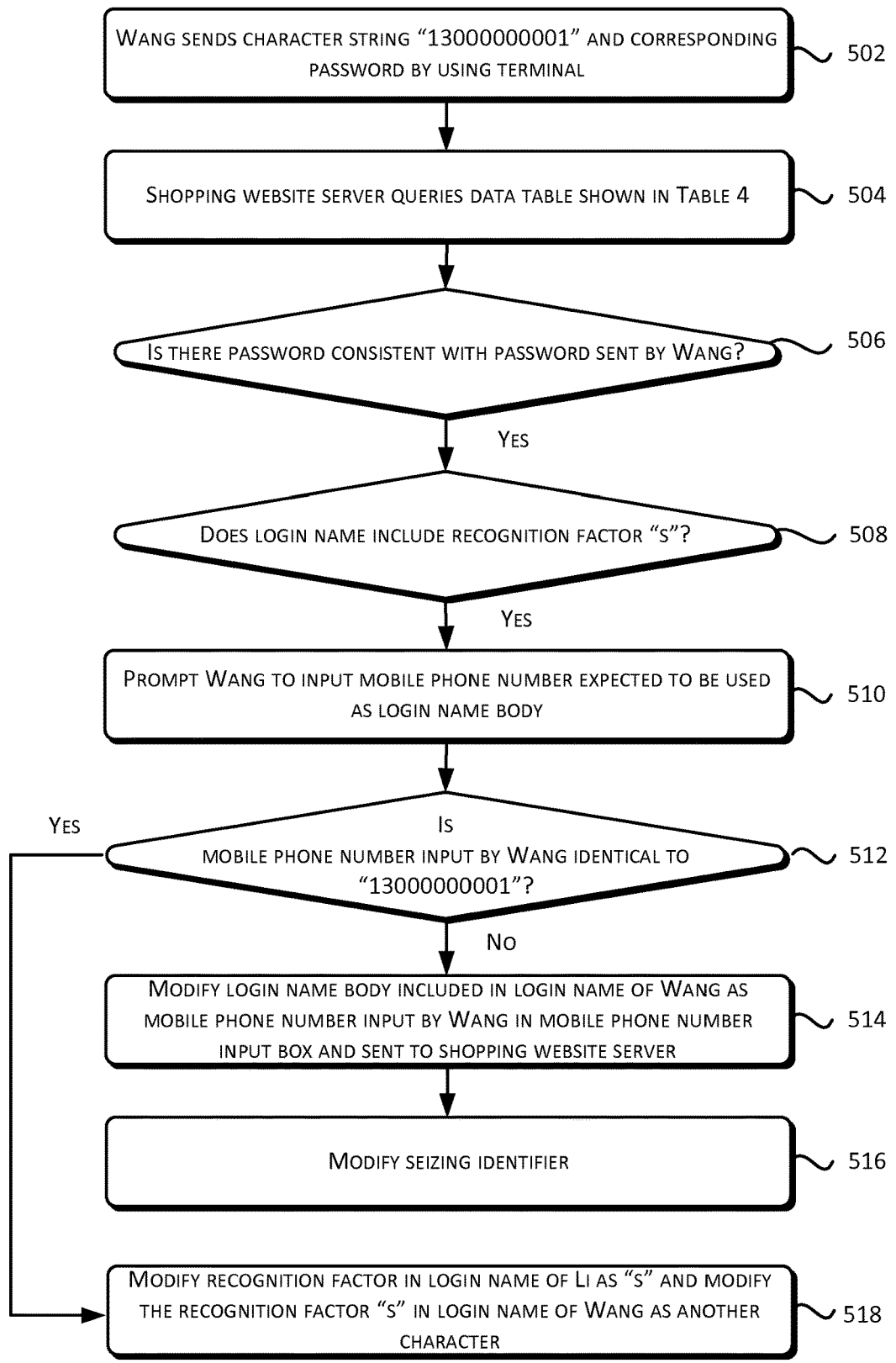
FIG. 5 is a flow chart of an example logging in to a shopping website server by a former user using a mobile phone number for access according to the third example embodiment of the present disclosure.

Referring to FIG. 5, FIG. 5 is a schematic flow chart of the former user Wang logging in the shopping website server by using the mobile phone number allocated for the first time for access after operations from 402 to 424 are executed, which may mainly include the following operations.

At 502, when intending to log in the shopping website server, Wang sends a character string "13000000001" and a corresponding password to the shopping website server by using a terminal used by Wang.

At 504, the shopping website server queries the data table as shown in Table 4.

At 506, when a query result obtained by executing 504 indicates that "Table 4 has a stored seizing identifier corresponding to a login name including the character string '13000000001' and set as 1," the shopping website server determines that Table 4 includes at least two login names including the character string "13000000001," and sequentially queries passwords corresponding to the login names including the character string "13000000001" to determine whether there is a password consistent with the password sent by Wang, and then executes operations at 508 until a password consistent with the password sent by Wang is found through querying. If no password consistent with the password sent by Wang is found through querying, Wang may be prompted as login failure. The process ends.

When a query result obtained by executing 504 indicates that "Table 4 does not have a seizing identifier stored corresponding to a login name including the character string '13000000001' and set as 1," the shopping website server merely queries a password corresponding to the only one login name including the character string "13000000001" in Table 4 to determine whether the password is consistent with the password sent by Wang. When a determination result is yes, operations at 508 are executed. When the determination result is no, Wang is prompted a message indicating login failure. The process ends.

It should be noted that when a private login name body exists, during a process that queries whether there is a password consistent with the password sent by Wang, login names including recognition factors started with "T" may be removed firstly from the login names including the character string "13000000001" in Table 4; and then passwords corresponding to the other login names including the character string "13000000001" are queried to determine whether there is a password consistent with the password sent by Wang.

In the third example embodiment, if the user intends to obtain a resource access right matching the private login name body, the user may initiates a private login request to the shopping website server to trigger the shopping website server to push a verification code to a terminal used by the user. After the user returns the verification code to the shopping website server, if the shopping website server passes verification of the verification code, the server may allocate the resource access right matching the private login name body to the terminal used by the user.

At 508, the shopping website server determines whether a queried login name corresponding to the password consistent with the password sent by Wang in Table 4 includes a recognition factor "s," and when determining that the login name includes the recognition factor "s," executes operations at 510; otherwise, executes an operation such as responding to an access request sent by the terminal used by Wang.

At 510, the shopping website server determines that Wang who is currently logging into the shopping website server is a "former user" and thus instructs the terminal used by Wang to display a mobile phone number input box to prompt Wang to input a mobile phone number expected as a login name body.

At 512, the shopping website server determines whether a mobile phone number input by Wang in the mobile phone number input box and sent to the shopping website server is identical to "13000000001," and when a determination result is no, executes operations at 514; otherwise, executes operations at 518.

At 514, the shopping website server modifies Table 4, and modifies the login name body included in the login name of Wang as the mobile phone number input by Wang in the mobile phone number input box and sent to the shopping website server.

At 516, the shopping website server modifies the seizing identifier in the line, in which the modified mobile phone number is located, as "0," and also modifies the seizing identifier in the line, in which the login name of Li is located, as "0." The process ends.

At 518, the shopping website server modifies the recognition factor in the login name of Li as "s," and modifies the recognition factor "s" in the login name of Wang as another character. The process ends.

As known from operations from 502 to 518, by using the method provided in the third example embodiment, the former user may be still allowed to use the login name identical to the login name used by the latter user, and the processes of the former user and the latter user that user the login name will not conflict to each other, thereby effectively solving the problem that the latter user may not use the mobile phone number allocated for the second time as a login name as long as the human customer service does not modify the login name used by the former user, and the problem that after the latter use successfully registers by using the mobile phone number allocated for the second time as a login name, the former user will lose a login portal and may not login by using the mobile phone number.

A fourth example embodiment provides two kinds of data uniqueness control apparatuses, which are used to flexibly control data uniqueness and are applicable to a scenario having different uniqueness control requirements of different types of data.

Figure 6:
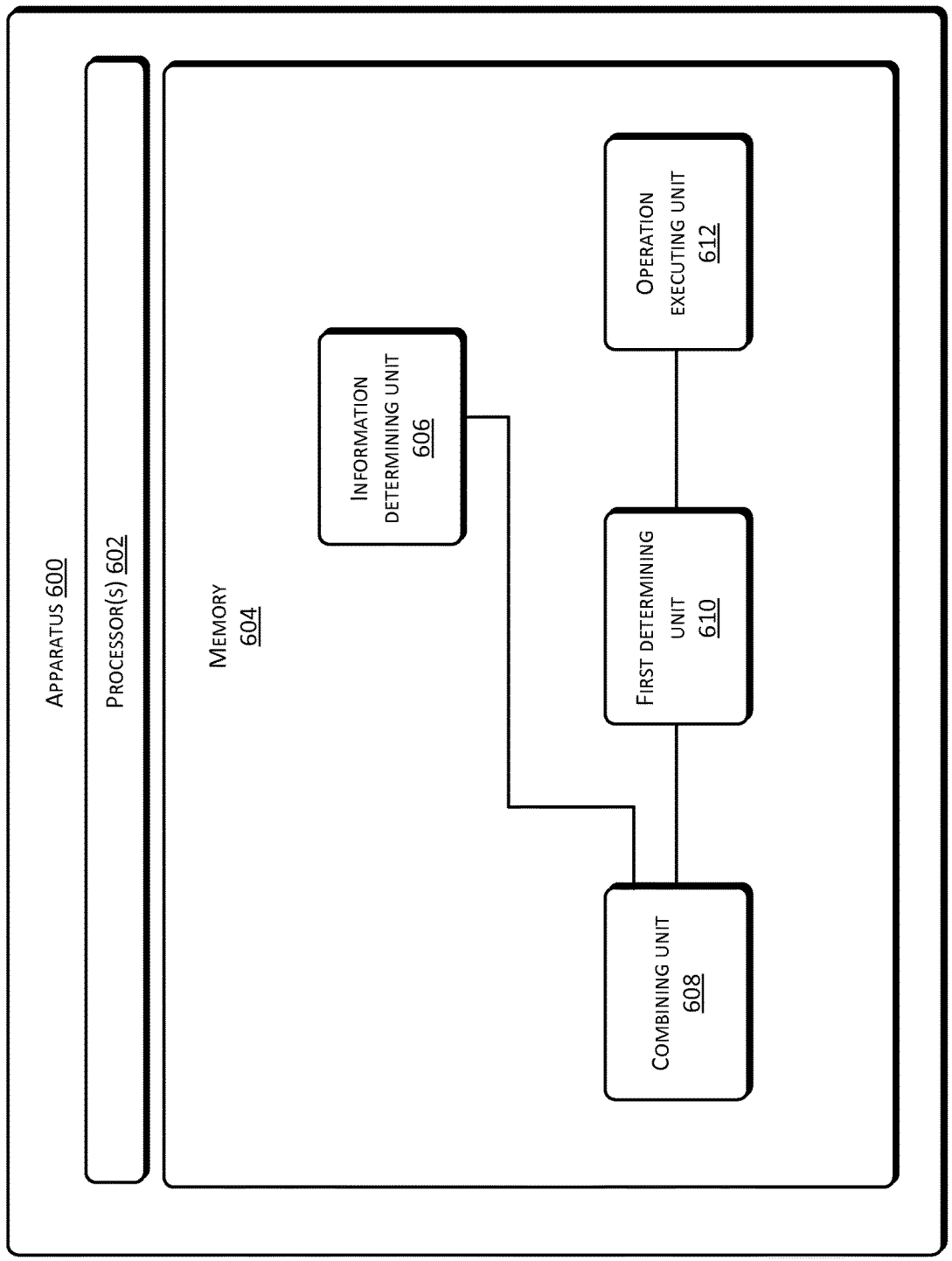
FIG. 6 is a schematic diagram of an example data uniqueness control apparatus according to a fourth example embodiment of the present disclosure.

A schematic diagram of a first example data uniqueness control apparatus 600 is shown in FIG. 6. The data uniqueness control apparatus 600 includes one or more processor(s) or data processing unit(s) 602 and memory 604. The apparatus 600 may further include one or more input/output devices and network interfaces (not shown in FIG. 6). The memory 604 is an example of computer-readable media.

The memory 604 may store therein a plurality of modules or units including an information determining unit 606, a combining unit 608, a first determining unit 610, and an operation executing unit 612. Functionalities of these functional units are described as follows:

The information determining unit 606 determines control information mapped by a data storage space of a database in which data is to be written. Data storage spaces of the database corresponding to data with different to-be-written contents are mapped to the same control information. The control information is determined according to specific data mapped by each data storage space.

The combining unit 608 combines data to be written into the data storage space and the control information determined by the information determining unit 606 to obtain a combination result.

The first determining unit 610 determines whether there is another combination result that is the same as the combination result obtained by the combining unit 608. The another combination result is a combination result obtained by combining data stored in another data storage space of the database and control information mapped by the another data storage space.

The operation executing unit 612, when a determination result obtained by the first determining unit 610 is yes, executes the following operations: rejecting to write into the data storage space the data to be written into the data storage space of the database; or modifying data in the database such that the database does not have another combination result that is the same as the combination result obtained by the combining unit 608, and writing into the data storage space the data to be written into the data storage space of the database.

Optionally, as shown in FIG. 6, the data uniqueness control apparatus 600 may further include a space determining unit and a storage executing unit (both not shown in FIG. 6) stored on the memory 604. The space determining unit, before the information determining unit 606 determines the control information, determines, from the database, control information storage spaces mapped by data storage spaces corresponding to data with different to-be-written contents. The storage executing unit stores the same control information in the control information storage spaces determined by the space determining unit.

The space determining unit may also, before the information determining unit 606 determines the control information, determine, from the database, control information storage spaces mapped by data storage spaces corresponding to data with same to-be-written contents. Correspondingly, the storage executing unit store different control information in the control information storage spaces determined by the space determining unit.

Optionally, the data uniqueness control apparatus 600 as shown in FIG. 6 may further include a mapping relationship establishing unit (not shown in FIG. 6) stored on memory 604 that, after the operation executing unit writes the data to be written into the data storage space of the database into the data storage space, establishes a mapping relationship between the data to be written into the data storage space of the database and a conflict identifier, and establishes a mapping relationship between the modified data in the database and the conflict identifier.

Optionally, the data uniqueness control apparatus 600 as shown in FIG. 6 may further include a request receiving unit, a querying unit, an instructing unit, and a data updating unit (not shown in FIG. 6) stored on memory 604.

The request receiving unit receives a data access request sent by a terminal. The querying unit queries data in the database according to the data access request received by the request receiving unit. The instructing unit, when it is determined that a conflict identifier having a mapping relationship with the data queried by the querying unit exists, instructs the terminal to execute the operation of prompting a user to input an instruction for indicating whether to modify the queried data.

The data updating unit, when an instruction sent by the terminal for indicating modification of the queried data is received, updates the queried data by using data included in the instruction.

Further, the data uniqueness control apparatus 600 may include a mapping relationship terminating unit (not shown in FIG. 6) stored on memory 604 that, after the data updating unit updates the queried data, terminates the mapping relationship between the queried data and the conflict identifier.

Optionally, when the operation executing unit 612 performs a reversible modification on the data in the database, the data uniqueness control apparatus 600 as shown in FIG. 6 may further include a second determining unit and a data modifying unit (not shown in FIG. 6) stored on memory 604.

The second determining unit, when an instruction sent by the terminal for indicating not to modify the queried data is received, determines whether the queried data is data undergone the reversible modification.

The data modifying unit, when a determination result obtained by the second determining unit is yes, executes a reverse operation of the reversible modification on the queried data so as to obtain the modified data; and executes the reversible modification on data in the database that is the same as the modified data.

A second example data uniqueness control apparatus provided in the fourth example embodiment may mainly include one or more processors that performs the following operations:

1. determining control information mapped by a data storage space of a database. Data storage spaces of the database having data with different to-be-written contents are mapped to the same control information; and the control information is determined according to specific data mapped by each data storage space.

2. combining data to be written into the data storage space of the database and the determined control information to obtain a combination result.

3. determining whether there is another combination result that is the same as the obtained combination result. The another combination result is a combination result obtained by combining data stored in another data storage space of the database and control information mapped by the another data storage space.

4. when determining that there is another combination result that is the same as the obtained combination result, executing the following operations: rejecting to write into the data storage space the data to be written into the data storage space of the database; or modifying data in the database so that the database does not have another combination result that is the same as the obtained combination result, and writing into the data storage space the data to be written into the data storage space of the database.

By using any of the above apparatus provided in the fourth example embodiment of the present disclosure, data storage spaces having data with different to-be-written contents may be mapped to the same control information; data storage spaces having data with the same to-be-written content may be mapped to different control information, and uniqueness control of data may be implemented based on the control information. Therefore, different uniqueness control for different data of the same service system may be supported, thereby implementing the flexible control on the data uniqueness. The techniques of the present disclosure are applicable to a scenario having different uniqueness control requirements for different types of data.

Figure 7:
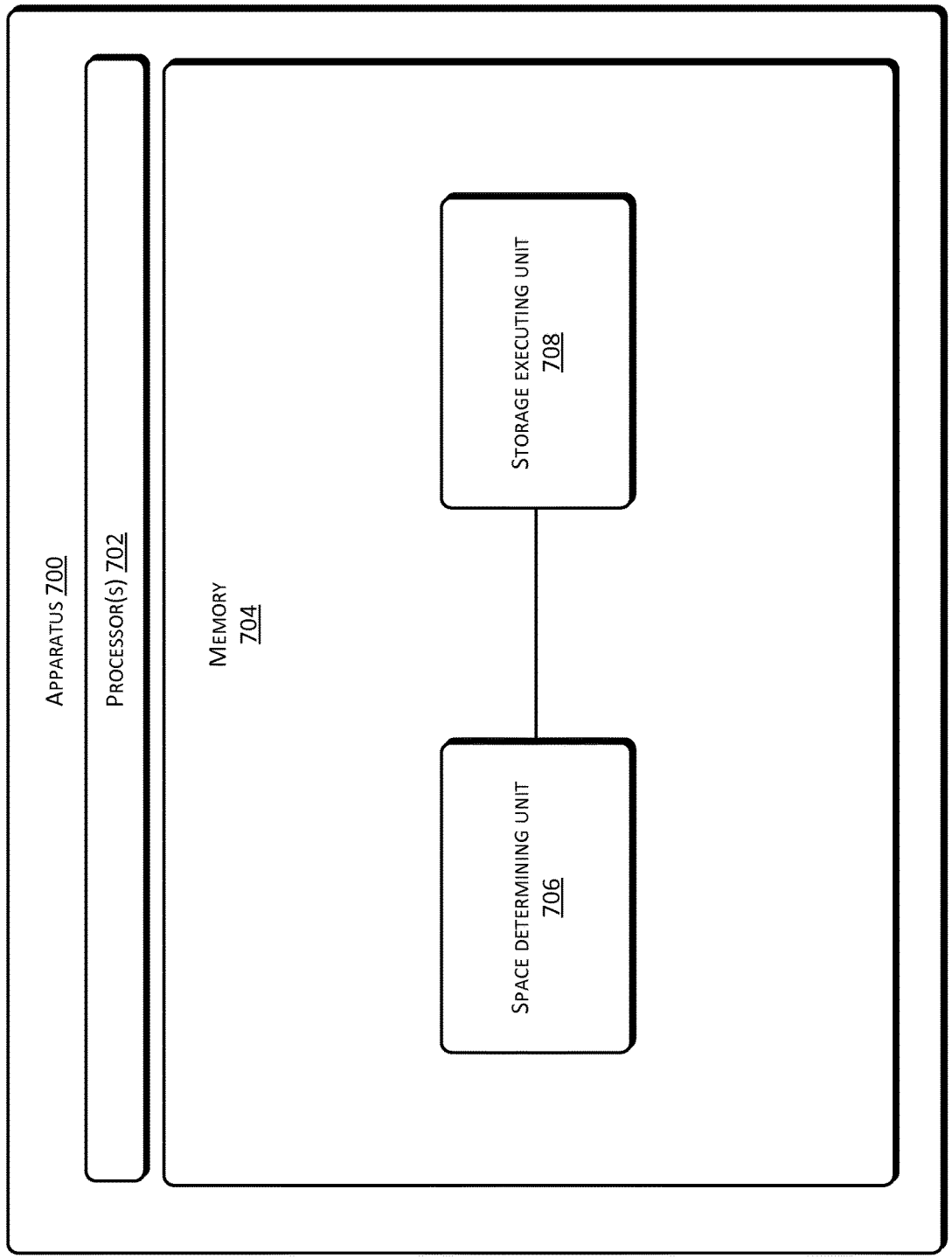
FIG. 7 is a schematic diagram of an example information storage apparatus according to a fifth example embodiment of the present disclosure.

A fifth example embodiment of the present disclosure provides four kinds of information storage apparatuses to implement storage of control information. A schematic diagram of a specific structure of a first example information storage apparatus 700 is shown in FIG. 7, and the apparatus 700 includes one or more processor(s) or data processing unit(s) 702 and memory 704. The apparatus 700 may further include one or more input/output devices and network interfaces (not shown in FIG. 7). The memory 704 is an example of computer-readable media.

The memory 704 may store therein a plurality of modules or units including a space determining unit 706 and a storage executing unit 708.

The space determining unit 706 determines, from a database, a first control information storage space mapped by data storage spaces having data with different to-be-written contents respectively.

The storage executing unit 708 stores the same control information in the first control information storage space determined by the space determining unit 706.

The space determining unit 706 determines, from the database, a second control information storage space mapped by data storage spaces having data with the same to-be-written contents respectively. The storage executing unit 708 stores different control information in the second control information storage space determined by the space determining unit 706.

A second example information storage apparatus provided in the fifth example embodiment mainly includes one or more processors that determine, from a database, a first control information storage space mapped by data storage spaces having data with different to-be-written contents, and store the same control information in the determined first control information storage space. Further, the one or more processors determine, from the database, a second control information storage space mapped by data storage spaces having data with the same to-be-written contents respectively, and store different control information in the empty second control information storage space.

A third example information storage apparatus provided in the fifth example embodiment may include one or more processor(s) or data processing unit(s) and memory. The apparatus may further include one or more input/output devices and network interfaces. The memory is an example of computer-readable media. The memory 704 may store therein a space determining unit and a storage executing unit. The space determining unit determines, from a database, control information storage spaces mapped by data storage spaces corresponding to data with the same to-be-written contents respectively. The storage executing unit stores different control information in the determined control information storage spaces.

A fourth information storage apparatus provided in the fifth example embodiment may include one or more processors that determine, from a database, control information storage spaces mapped by data storage spaces corresponding to data with the same to-be-written contents, and store different control information in the determined control information storage spaces.

Persons skilled in the art should understand that the embodiment of the present disclosure may be provided as a method, a system, or a computer program product. Therefore, the present disclosure may be implemented as a completely hardware embodiment, a completely software embodiment, or a combination of software and hardware. Moreover, the present disclosure may be a computer program product implemented on one or more computer-readable media (including, but not limited to, a magnetic disk memory, a CD-ROM, an optical memory, and the like) storing computer-executable instructions or codes.

The present disclosure is described with reference to flow charts and/or block diagrams according to the method, device (system) and computer program product according to the embodiments of the present disclosure. It should be understood that computer-executable instruction may be used to implement each process and/or block in the flow charts and/or block diagrams and combinations of processes and/or blocks in the flow charts and/or block diagrams. The computer-executable instructions may be provided to a universal computer, a dedicated computer, an embedded processor or another programmable data processing device to generate a machine, such that the computer or a processor of the programmable data processing device executes the computer-executable instructions to generate an apparatus that implements functionalities designated in one or more processes in a flow chart and/or one or more blocks in a block diagram.

The computer-executable instructions may also be stored in a computer-readable media to instruct a computer or a programmable data processing device to operate in a specific manner so that the computer-executable instructions stored in the computer-readable media generates a product including an instruction apparatus, and the instruction apparatus implements functionalities designated by one or more processes in a flow chart and/or one or more blocks in a block diagram.

The computer-executable instructions may also be loaded in a computer or a programmable data processing device such that a series of operations are executed on the computer or the programmable device to generate a computer-implemented processing, and therefore, the computer-executable instructions executed in the computer or programmable device provides operations for implementing functionalities designated in one or more processes in a flow chart and/or one or more blocks in a block diagram.

In a standard configuration, a computing device, such as the apparatus or the terminal, as described in the present disclosure may include one or more central processing units (CPU), one or more input/output interfaces, one or more network interfaces, and memory.

The memory may include forms such as non-permanent memory, random access memory (RAM), and/or non-volatile memory such as read only memory (ROM) and flash random access memory (flash RAM) in the computer-readable media. The memory is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

It should be noted that the term "including," "comprising," or any variation thereof refers to non-exclusive inclusion so that a process, method, product, or device that includes a plurality of elements does not only include the plurality of elements but also any other element that is not expressly listed, or any element that is essential or inherent for such process, method, product, or device. Without more restriction, the elements defined by the phrase "including a . . . " does not exclude that the process, method, product, or device includes another same element in addition to the elements.

One of ordinary skill in the art would understand that the example embodiments may be presented in the form of a method, a system, or a computer software product. Thus, the present techniques may be implemented by hardware, computer software, or a combination thereof. In addition, the present techniques may be implemented as the computer software product that is in the form of one or more computer storage media (including, but is not limited to, disk, CD-ROM, or optical storage device) that include computer-executable or computer-readable instructions.

The above description describes the example embodiments of the present disclosure, which should not be used to limit the present disclosure. One of ordinary skill in the art may make any revisions or variations to the present techniques. Any change, equivalent replacement, or improvement without departing the spirit and scope of the present techniques shall still fall under the scope of the claims of the present disclosure.

What is claimed is:

1. A method, executable by one or more processors, for data uniqueness control, the method comprising:
   determining control information according to specific data mapped by a data storage space of a database;
   combining the control information and data to be written into the data storage space to obtain a combination result;
   determining that there is another combination result that is the same as the combination result, the another combination result combining another data stored in another data storage space of the database and another control information mapped by the another data storage space;
   ensuring data uniqueness of the data to be written into the database by:
      modifying the stored another data of the another combination result in the another data storage space of the database so that there is not another combination result that is the same as the combination result;
      writing into the data storage space the data to be written into the data storage space of the database;
      establishing a mapping relationship between the data to be written into the data storage space of the database and a conflict identifier;
      establishing a mapping relationship between the modified data in the database and the conflict identifier; and
      mapping different data storage spaces of the database having data of different contents to the same control information, the modifying including changing the conflict identifier of the stored another data to indicate a co-existence of the data and the stored another data, the data and the stored another data having a same login name; and
   receiving a data access request sent by a terminal;
   querying data in the database according to the data access request;
   instructing the terminal to prompt a user to input an instruction for indicating whether to modify the queried data in response to determining that the conflict identifier having the mapping relationship with the queried data exists; and
   in response to receiving an instruction sent by the terminal for indicating modification of the queried data, updating the queried data, the updating the queried data including performing a reversible modification on the queried data in the database; and in response to receiving an instruction sent by a terminal for indicating not to modify queried data, determining that the queried data is the data undergone the reversible modification;

executing a reverse operation of the reversible modification on the queried data to obtain modified data; and executing the reversible modification on data in the database that is the same as the modified data.

2. The method of claim 1, further comprising:

prior to determining the control information according to the specific data mapped by the data storage space, determining, from the database, control information storage spaces mapped by data storage spaces to be written into data having different contents; and storing same control information in the determined control information storage spaces.

3. The method of claim 1, further comprising:

prior to determining the control information according to the specific data mapped by the data storage space, determining, from the database, control information storage spaces mapped by data storage spaces to be written into data having same contents; and storing different control information in the determined control information storage spaces.

4. The method of claim 1, further comprising:

terminating the mapping relationship between the queried data and the conflict identifier after the updating the queried data by using data included in the instruction.

5. A computer-readable medium storing executable instructions that, when executed by one or more processors, cause the one or more processors to perform acts comprising:

determining control information according to specific data mapped by a data storage space of a database, the control information including a first login name;

combining the control information and data to be written into the data storage space to obtain a combination result;

determining that there is another combination result that is the same as the combination result, the another combination result combining another data stored in another data storage space of the database and another control information mapped by the another data storage space, the another control information including a second login name;

ensuring data uniqueness of the data to be written in the database by:

modifying the stored another data of the another combination result in the another data storage space of the database so that there is not another combination result that is the same as the combination result;

writing into the data storage space the data to be written into the data storage space of the database;

establishing a mapping relationship between the data to be written into the data storage space of the database and a conflict identifier;

establishing a mapping relationship between the modified data in the database and the conflict identifier; and mapping different data storage spaces of the database having data of different contents to the same control information, the modifying including:

changing the conflict identifier of the stored another data to indicate a co-existence of the data and the stored another data; and keeping the first login name corresponding to the data and the second login name corresponding to the another data, the first login name being the same as the second login name for a same website; and receiving a data access request sent by a terminal;

querying data in the database according to the data access request;

instructing the terminal to prompt a user to input an instruction for indicating whether to modify the queried data in response to determining that the conflict identifier having the mapping relationship with the queried data exists; and in response to receiving an instruction sent by the terminal for indicating modification of the queried data, updating the queried, the updating the queried data including performing a reversible modification on the queried data in the database; and in response to receiving an instruction sent by a terminal for indicating not to modify queried data, determining that the queried data is the data undergone the reversible modification;

executing a reverse operation of the reversible modification on the queried data to obtain modified data; and executing the reversible modification on data in the database that is the same as the modified data.

6. The computer-readable medium of claim 5, wherein the acts further comprise:

prior to determining the control information according to the specific data mapped by the data storage space, determining, from the database, control information storage spaces mapped by data storage spaces to be written into data having different contents; and storing same control information in the determined control information storage spaces.

7. The computer-readable medium of claim 5, wherein the acts further comprise:

prior to determining the control information according to the specific data mapped by the data storage space, determining, from the database, control information storage spaces mapped by data storage spaces to be written into data having same contents; and storing different control information in the determined control information storage spaces.

8. The computer-readable medium of claim 5, wherein the acts further comprise:

terminating the mapping relationship between the queried data and the conflict identifier after the updating the queried data by using data included in the instruction.

9. An apparatus comprising:

one or more processors; and one or more computer-readable media storing executable instructions that, when executed by the one or more processors, cause the one or more processors to perform acts comprising determining control information according to specific data mapped by a data storage space of a database;

combining the control information and data to be written into the data storage space to obtain a combination result;

determining that there is another combination result that is the same as the combination result, the another combination result combining another data stored in another data storage space of the database and another control information mapped by the another data storage space;

ensuring data uniqueness of the data to be written into the database by:
    modifying the stored another data of the another combination result in the another data storage space of the database so that there is not another combination result that is the same as the combination result;
    writing into the data storage space the data to be written into the data storage space of the database;
    establishing a mapping relationship between the data to be written into the data storage space of the database and a conflict identifier;
    establishing a mapping relationship between the modified data in the database and the conflict identifier; and
    mapping different data storage spaces of the database having data of different contents to the same control information, the modifying including changing the conflict identifier of the stored another data to indicate a co-existence of the data and the stored another data, the data and the stored another data having a same login name; and receiving a data access request sent by a terminal;
querying data in the database according to the data access request;
instructing the terminal to prompt a user to input an instruction for indicating whether to modify the queried data in response to determining that the conflict identifier having the mapping relationship with the queried data exists; and
    in response to receiving an instruction sent by the terminal for indicating modification of the queried data, updating the queried data, the updating the queried data including performing a reversible modification on the queried data in the database; and
    in response to receiving an instruction sent by a terminal for indicating not to modify queried data,
        determining that the queried data is the data undergone the reversible modification;
        executing a reverse operation of the reversible modification on the queried data to obtain modified data; and
        executing the reversible modification on data in the database that is the same as the modified data.

10. The apparatus of claim 9, wherein the acts further comprise:
    prior to determining the control information according to the specific data mapped by the data storage space,
        determining, from the database, control information storage spaces mapped by data storage spaces to be written into data having different contents; and
        storing same control information in the determined control information storage spaces.

11. The apparatus of claim 9, wherein the acts further comprise:
    prior to determining the control information according to the specific data mapped by the data storage space,
        determining, from the database, control information storage spaces mapped by data storage spaces to be written into data having same contents; and
        storing different control information in the determined control information storage spaces.

12. The apparatus of claim 11, wherein the acts further comprise:
    terminating the mapping relationship between the queried data and the conflict identifier after the updating the queried data by using data included in the instruction.

13. The apparatus of claim 9, wherein the control information includes a character string.

14. The apparatus of claim 9, wherein the control information includes an account identification.

15. The apparatus of claim 9, wherein the acts further comprise storing the control information in a control information storage space.

16. The method of claim 1, wherein the control information includes a character string.

17. The method of claim 1, further comprising storing the control information in a control information storage space.

18. The method of claim 1, wherein the control information includes an account identification.

19. The computer-readable medium of claim 5, wherein the acts further comprise storing the control information in a control information storage space.

20. The computer-readable medium of claim 5, wherein the control information includes an account identification.

* * * * *